(12) United States Patent
Olson et al.

(10) Patent No.: US 12,119,703 B2
(45) Date of Patent: Oct. 15, 2024

(54) SYSTEM CONFIGURED TO DECREASE BATTERY AGEING OF EAR WEARABLE DEVICE DUE TO TRANSPORTATION OR STORAGE OF THE DEVICE WHILE ENSURING HIGH CHARGE BEFORE INITIAL USE

(71) Applicant: Starkey Laboratories, Inc., Eden Prairie, MN (US)

(72) Inventors: Kyle Olson, St. Louis Park, MN (US); Justin Burwinkel, Eden Prairie, MN (US); Michael Karl Sacha, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 372 days.

(21) Appl. No.: 17/621,186

(22) PCT Filed: Jun. 29, 2020

(86) PCT No.: PCT/US2020/040133
§ 371 (c)(1),
(2) Date: Dec. 20, 2021

(87) PCT Pub. No.: WO2021/003100
PCT Pub. Date: Jan. 7, 2021

(65) Prior Publication Data
US 2022/0352742 A1 Nov. 3, 2022

Related U.S. Application Data

(60) Provisional application No. 62/869,221, filed on Jul. 1, 2019.

(51) Int. Cl.
*H01M 10/44* (2006.01)
*H01M 10/46* (2006.01)
(Continued)

(52) U.S. Cl.
CPC ............ *H02J 7/342* (2020.01); *H02J 7/0044* (2013.01)

(58) Field of Classification Search
CPC ......... H02J 7/342; H02J 7/0044; H02J 7/0042
(Continued)

(56) References Cited

U.S. PATENT DOCUMENTS 10,659,862 B1 * 5/2020 Rugolo ................ H04R 1/1058
2007/0236174 A1 10/2007 Kaye
(Continued)

OTHER PUBLICATIONS

International Preliminary Report on Patentability from International Application No. PCT/US2020/040133, dated Jan. 13, 2022, 9 pp.
(Continued)

*Primary Examiner* — Edward Tso
(74) *Attorney, Agent, or Firm* — Shumaker & Sieffert, P.A.

(57) ABSTRACT

An example system includes an ear-wearable device comprising a housing and a rechargeable battery located within the housing; a supplemental power storage device configured to provide electrical energy; and circuitry configured to transfer, responsive to occurrence of an event, electrical energy from the supplemental power storage device to the rechargeable battery prior to an initial use of the ear-wearable device.

15 Claims, 6 Drawing Sheets

(51) Int. Cl.
*H02J 7/00* (2006.01)
*H02J 7/34* (2006.01)

(58) Field of Classification Search
USPC .................................. 320/103, 112, 114, 115
See application file for complete search history.

(56) References Cited

U.S. PATENT DOCUMENTS

| | | |
|---|---|---|
| 2009/0278493 A1 | 11/2009 | Alden |
| 2011/0259953 A1 | 10/2011 | Baarman et al. |
| 2014/0121829 A1 | 5/2014 | Gospodarek |
| 2017/0064437 A1* | 3/2017 | Hviid ................... B65D 75/563 |
| 2019/0124432 A1 | 4/2019 | Champy |

OTHER PUBLICATIONS

International Search Report and Written Opinion of International Application No. PCT/US2020/040133, dated Oct. 7, 2020, 14 pp.
Communication pursuant to Article 94(3) EPC from counterpart European Application No. 20745364.8 dated Jul. 4, 2023, 7 pp.
Response to Communication pursuant to Article 94(3) EPC dated Jul. 4, 2023, from counterpart European Application No. 20745364.8 filed Dec. 19, 2023, 54 pp.

* cited by examiner

SYSTEM CONFIGURED TO DECREASE BATTERY AGEING OF EAR WEARABLE DEVICE DUE TO TRANSPORTATION OR STORAGE OF THE DEVICE WHILE ENSURING HIGH CHARGE BEFORE INITIAL USE

This application is a national stage application under 35 U.S.C. § 371 of PCT Application No. PCT/US2020/040133, filed Jun. 29, 2020, which claims the benefit of U.S. Provisional Application No. 62/869,221 filed Jul. 1, 2019. The entire contents of each of PCT Application No. PCT/US2020/040133 and U.S. Provisional Application No. 62/869,221 are incorporated herein by reference in their entirety.

TECHNICAL FIELD

This disclosure relates to battery powered devices.

BACKGROUND

As devices become increasingly complex and include new features, their use can quickly deplete a typical, disposable power source (e.g., zinc-air primary-cell battery), resulting in a user having to frequently dispose of, and replace, dead batteries. Having to frequently swap out a depleted power source, particularly for someone with reduced finger dexterity, can be challenging and tedious. As such, many modern devices include rechargeable batteries that provide electrical power to various components of the devices.

SUMMARY

This disclosure describes techniques for increasing a charge state of a rechargeable battery of an ear-wearable device prior to an initial use of the ear-wearable device. In some cases, the ear-wearable device may be packaged, stored, and/or shipped with the rechargeable battery having a relatively low charge state (e.g., 30-50%). Packaging, storing, and/or shipping the ear-wearable device with the rechargeable battery having a relatively low charge state may help to preserve the useful life of the rechargeable battery. However, it may be desirable for the rechargeable battery of the ear-wearable device to have a high charge state prior to an initial use of the ear-wearable device (e.g., being removed from packaging). For instance, it may be desirable for the rechargeable battery to be fully charged prior to the initial use such that the ear-wearable device may be programmed/configured/used without having to wait to charge the rechargeable battery.

In accordance with one or more techniques of this disclosure, an ear-wearable device may include a rechargeable battery that is charged prior to an initial use of the ear-wearable device using electrical energy sourced from a power source included in a same packaging as the ear-wearable device. The power storage device may be an additional battery, which may or may not be rechargeable. Responsive to occurrence of an event associated with the initial use of the ear-wearable device, circuitry in the packaging may utilize electrical power sourced from the additional battery to increase the charge state of the rechargeable battery of the ear-wearable device. In this way, the techniques of this disclosure may enable packaging, storing, and/or shipping the rechargeable battery with a relatively low charge state, and thus preserving the useful life of the rechargeable battery, while also enabling that the charge state of the rechargeable battery of the ear-wearable device may be increased prior the initial use.

In one example, a system includes an ear-wearable device comprising a housing and a rechargeable battery located within the housing; a supplemental power storage device configured to provide electrical energy; and circuitry configured to transfer, responsive to occurrence of an event, electrical energy from the supplemental power storage device to the rechargeable battery prior to an initial use of the ear-wearable device.

In another example, a method includes monitoring, by one or more components included in a product package of a device, for occurrence of an event; and responsive to detecting occurrence of the event, transferring electrical energy from a supplemental power storage device included in the product package to a rechargeable battery of the device.

In another example, a product package includes a device including a rechargeable battery; means for storing supplemental electrical energy; and means for transferring, responsive to detecting occurrence of an event, electrical energy from the means for storing supplemental electrical energy to the rechargeable battery of the device.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
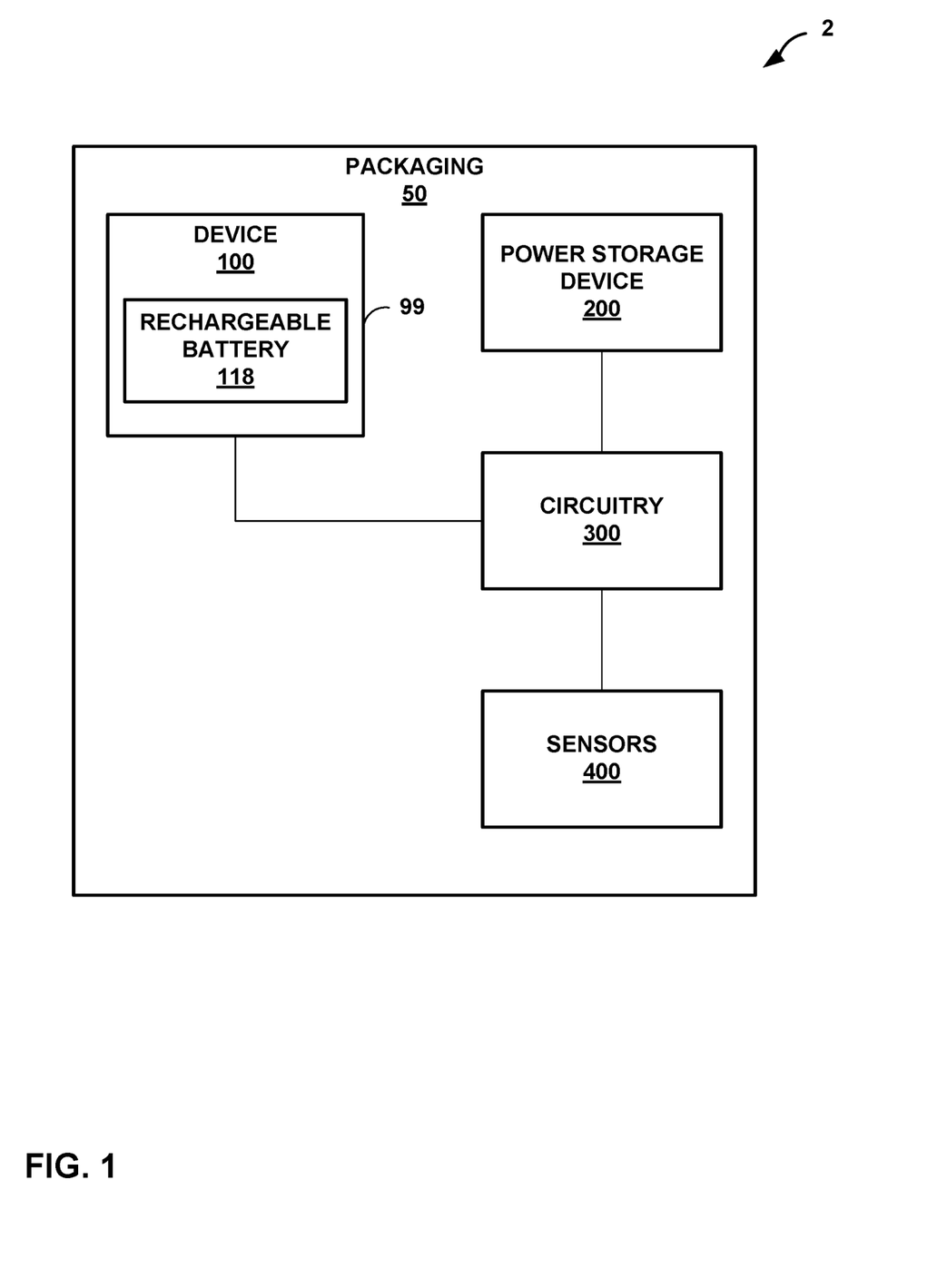
FIG. 1 is a block diagram illustrating a system for increasing a charge state of a rechargeable battery of a device prior to an initial use of the device, in accordance with one or more techniques of this disclosure.

FIG. 1 is a block diagram illustrating a system for increasing a charge state of a rechargeable battery of a device prior to an initial use of the device, in accordance with one or more techniques of this disclosure. As shown in FIG. 1, system 2 includes packaging 50, device 100, power storage device 200, and circuitry 300.

Packaging 50 may protect various components of system 2 during shipment and/or storage. As shown in FIG. 1, device 100, power storage device 200, and circuitry 300 may be included in packaging 50. Packaging 50 may be formed of any suitable material, or combination of materials, to protect the components of system 2. Examples of packaging 50 include, but are not limited to, boxes, tubes, bags, blister packs, and the like. In some examples, packaging 50 may include retail packaging that includes identifiers of the items contained within packaging 50. For instance, packaging 50 may be retail packaging for device 100. In some examples, packaging 50 may include outer packaging and inner packaging. For instance, packaging 50 may include an outer box that contains an electrostatic discharge (ESD) bag, which contains device 100.

Device 100 may represent any electronic device that is powered using a rechargeable battery. In the example of FIG. 1, device 100 may be powered using rechargeable battery 118. Examples of device 100 include, but are not limited to, mobile computing devices (e.g., smartphones, laptops, e-readers), ear-wearable devices headphones, hearing aids, personal sound amplifiers, cochlear implants, cochlear implant processors, hearables, osseointegrated hearing devices, and the like), or any other electronic device.

Device 100 may include a housing that encloses one or more components of device 100. As shown in FIG. 1, housing 99 of device 100 may enclose rechargeable battery 118 such that rechargeable battery 118 is included in housing 99.

Rechargeable battery 118 may be a secondary cell that stores electrical power for use by other components of device 100. Examples of rechargeable battery 118 include, but are not limited to, lead-acid batteries, nickel-cadmium (NiCd) batteries, nickel-metal hydride (NiMH) batteries, lithium-ion (Li-ion) batteries, lithium-ion polymer (LiPo) batteries, silver-zinc, or any other type of secondary cells. Rechargeable battery 118 may be capable of being charged to various charge states, which may be annotated as percentages relative to a maximum capacity of rechargeable, battery 118. For instance, when rechargeable battery 118 is storing half of the maximum capacity of rechargeable battery 118, rechargeable battery 118 may be considered to be 50% charged. Rechargeable battery 118 may charge (i.e., increase charge state) using electrical power sourced from any other component, and may discharge (i.e., decrease charge state) to provide power to other components (e.g., other components of device 100).

In some examples, it may be desirable for rechargeable battery 118 to be placed into packaging. 50 at a reduced charge state. For instance, depending on the chemistry of rechargeable battery 118, storing rechargeable battery 118 at a high charge state (e.g., 100% charged) for extended periods of time may reduce the useful life of rechargeable battery 118. In examples where rechargeable battery 118 cannot be or cannot easily be replaced, the useful life of rechargeable battery 118 may dictate the useful life of device 100. As such, it may be desirable for the useful life of rechargeable battery 118 to be as long as possible.

However, while it may be desirable for rechargeable battery 118 to be placed into packaging 50 at a reduced charge state, it may also be desirable for rechargeable battery 118 to be at a relatively high charge state (e.g., greater than 80% charged, greater than 90% charged, 100% charged) when device 100 is removed from packaging 50. For instance, when device 100 is removed from packaging 50, it may not be desirable to spend time increasing the charge state of (i.e., charging) rechargeable battery 118 from the reduced charge state prior to initially using device 100.

In accordance with one or more techniques of this disclosure, power from power storage device 200 may be used to increase the charge state of rechargeable battery 118 before an initial use of device 100. For instance, power storage device 200 and circuitry 300 may be included in packaging 50 along with device 100. Responsive to occurrence of an event prior to device 100 being removed from packaging 50, circuitry 300 may transfer electrical power from power storage device 200 to rechargeable battery 118 in order to increase the charge state of rechargeable battery 118. In this way, rechargeable battery 118 may be placed into packaging 50 at a first charge state, while being removed from packaging 50 at a second charge state that is higher than the first charge state.

Power storage device 200 may store electrical power for use by other components of system 2. Power storage device 200 may include any type of device capable of storing or generating electrical power, such as batteries, fuel cells, solar panels, etc. Where power storage device 200 includes a battery, the battery may be a primary cell (i.e., non-rechargeable battery) or a secondary cell (i.e., rechargeable battery). In some examples, power storage device 200 may be included in packaging 50 separate from device 100. For instance, power storage device 200 may not be included in or on housing 99 of device 100. In some examples, power storage device 200 may be included in or on device 100. For instance, power storage device 200 may be included within, or may be attached to, housing 99 of device 100. In some examples, such as where power storage device 200 includes a secondary cell, power storage device 200 may be a type of battery that may be placed into packaging 50 at a relatively high charge state. In some examples, power storage device 200 may be a metal-air battery (e.g., a zinc air battery) that may use oxygen from air as a reagent to generate electrical power. Where power storage device 200 includes one or more solar panels, the solar panels may be affixed to, or integrated in, packaging 50.

Circuitry 300 may include electronic circuitry configured to selectively transfer electrical power from power storage device 200 to rechargeable battery 118. As discussed above, responsive to occurrence of an event prior to device 100 being removed from packaging 50, circuitry 300 may transfer electrical power from power storage device 200 to rechargeable battery 118 in order to increase the charge state of rechargeable battery 118. Circuitry 300 may detect occurrence of the event using data from any combination of operatively connected sensors 400. Example sensors include, but are not imited to, inertial motion units (IMUs) accelerometers, gyroscopes, magnetometers, barometers, etc.), microphones, magnetic field sensors (e.g., near field magnetic induction (NFMI) sensors, radio frequency identification (RFID) sensors, magnetometers, induction coils, etc.), wireless radios (e.g., Bluetooth radios, cellular radios, Wi-Fi radios, etc.), and/or physical controls (e.g., buttons, switches, pull tabs, dials, etc.).

In some examples, circuitry 300 may be included in packaging 50 separate from device 100. For instance, circuitry 300 may not be included in housing 99 of device 100. In some examples, circuitry 300 may be included in device 100. For instance, circuitry 300 may be included within housing 99 of device 100. In examples where circuitry 300 is included within housing 99 of device 100, circuitry 300 may perform operations in addition to selectively transferring electrical power between power storage device 200 and rechargeable battery 118. For instance, where device 100 is an ear-wearable device, circuitry 300 may, e.g., perform operations to filter and amplify ambient sound for the hearing benefit of a wearer of device 100.

As discussed above, responsive to occurrence of an event, circuitry 300 may transfer electrical power between power storage device 200 and rechargeable battery 118 in order to change the charge state of rechargeable battery 118. Some example events include, but are not limited to, point of sale scanning, activation at checkout, button press on packaging 50, leaving a distribution center, carrier tracking events, inter-package communication, removal of packaging 50 from shelf, opening of packaging 50, arrival to or departure from geofenced area, movement of packaging 50, voice activation, etc.

Circuitry 300 may determine that an event has occurred based on any operatively connected sensor or combination of sensors 400. As one example, one or more of sensors 400 may assist in determining that an event has occurred based on packaging 50 being scanned by a point of sale system. In some examples, a magnetic or NFMI sensor of sensors 400 may detect a magnetic field emitted by one or more components of the point of sale system. In some examples, a wireless radio of sensors 400 (e.g., Wi-Fi radio or Bluetooth radio) may receive a message from one or more components of the point of sale system indicating that packaging 50 has been scanned by the point of sale system. In response to determining that packaging 50 has scanned at by the point of sale system, one or more of sensors 400 may output a signal to circuitry 300 indicating occurrent of an event.

As another example, a physical control (e.g., a button) of sensors 400 may be integrated into packaging 50. In some examples, the physical control may be integrated into packaging 50 such that the physical control may be activated without requiring packaging 50 to be opened. For instance, the physical control may be located on the outside, or outer surface, of packaging 50. When activated, the physical control of sensors 400 may output a signal to circuitry 300 indicating occurrent of an event.

As another example, a physical control (e.g., a pull tab) of sensors 400 may operate as an insulator that opens a circuit of circuitry 300 connecting power storage device 200 to rechargeable battery 118. An event may be considered to occur when the physical control is altered (e.g., the pull tab is pulled/removed) such that the circuit of circuitry 300 is closed (e.g., and electrical energy may be transferred from power storage device 200 to rechargeable battery 118).

As another example, one or more of sensors 400 may determine that an event has occurred based on tracking events of a carrier of packaging 50. For instance, a carrier of packaging 50 may have a tracking system that scans or otherwise tracks progression of packaging 50 as it travels through a distribution network. The tracking system of the carrier may generate tracking events as packaging 50 travels through the distribution network (e.g., arrival at a warehouse, departure from a warehouse, loading on a vehicle, is out for delivery, has been delivered, etc.). The tracking system of the carrier may output or otherwise make available records of the tracking events. For instance, the tracking system may include an interface (e.g., an application programming interface (API)) that enables external systems to receive notifications when the tracking events are generated. In some examples, an external system may process the tracking events and output a signal to circuitry 300 that causes circuitry 300 to determine that an event has occurred. The external system may include any number of other devices or systems such as servers, cloud computers, mobile devices, mesh networks, networking elements, internet of things (IoT) devices, and the like. For instance, responsive to determining (e.g., based on a generated tracking event) that packaging 50 has been delivered (e.g., to an audiologist office or a user's home), the external system may output a message to packaging 50. In some examples, a wireless radio of sensors 400 (e.g., Wi-Fi radio, cellular radio, or Bluetooth radio) may receive the message indicating that packaging 50 has been delivered. In response to determining that packaging 50 has been delivered, the sensors of sensors 400 may output a signal to circuitry 300 indicating occurrence of an event.

As another example, one or more of sensors 400 may determine that an event has occurred based on removal of packaging 50 from a shelf. For instance, motion data generated by one or more motion sensors of sensors 400 (e.g., accelerometers, gyroscopes, barometer, etc.) may initially indicate that packaging 50 is stationary (e.g., sitting still on a shelf). At some later point in time, motion data generated by one or more motion sensors of sensors 400 may indicate that packaging 50 is moving (e.g., an accelerometer of sensors 400 may indicate acceleration has exceeded a threshold acceleration). In response to determining that packaging 50 is moving, the sensors of sensors 400 may determine that packaging 50 has been removed from the shelf. Responsive to determining that packagina 50 has been removed from the shelf, the sensors of sensors 400 may output a signal to circuitry 300 indicating occurrent of an event.

As another example, one or more of sensors 400 may determine that an event has occurred based on inter-package communications. For instance, where multiple packages (e.g., multiple packaging 50s) are on a shelf, the packages may communicate amongst each other, using any suitable means. As one example, when a front package of the multiple packages is removed from the shelf, the front package may output a message to a next package that the front package has been removed from the shelf. Responsive to receiving the message, the next package may determine that it is now the front package and sensors of the new front package may output a signal to circuitry of the new front package indicating occurrent of an event.

As another example, one or more of sensors 400 may determine that an event has occurred based on packaging 50 being opened. For instance, packaging 50 may include a flap that is opened during the opening of package 50. The flap may include a magnet and a reed-switch of sensors 400 may be positioned near the maanet such that opening of the flap results in the reed-switch opening. Responsive to the reed-switch opening, sensors 400 and/or circuitry 300 may determine that packaging 50 is being opened and that an event has occurred. Alternatively or additionally, packing 50 may include an IINIU (which may be same or different than IMU 114 of ear-wearable device 101), and may determine that packing 50 is being opened based on motion data generated by the IMU. Alternatively or additionally, packing 50 may include a magnetic packaging opening sensor that generates a signal when packaging 50 is opened.

As another example one or more of sensors 400 may determine that an event has occurred based the presence of a magnetic field. For instance, packing 50 may include one or more capacitive sensors, magnetic sensors of device 100 (e.g., telecoil, giant magnetoresistance (GMR), tunnel magnetoresistance (TMR), etc.). The capacitive sensors may generate a signal when packaging 50 is moved through a magnetic field, such as when packaging 50 is being brought into a store. Additionally or alternatively, the capacitive sensors may generate a signal when packaging 50 is being opened.

As another example, one or more of sensors 400 may determine that an event has occurred based on arrival to or departure from geofenced area. For instance, one or more position sensors of sensors 400 (e.g., one or more GPS receivers, GLONASS receivers, etc.) may determine a current position of packaging 50. Sensors 400 and/or circuitry 300 may compare the determined current position of packaging 50 with a geofenced area (e.g., area defined by a perimeter of coordinates, such as a distribution center or an audiologist office). In some examples, sensors 400 and/or circuitry 300 may determine that an event has occurred responsive to determining that packaging 50 has crossed a geofenced area. For instance, responsive to determining that the current position of packaging 50 has moved into the geofenced area, sensors 400 and/or circuitry 300 may determine that an event has occurred. In some examples, sensors 400 and/or circuitry 300 may determine that an event has occurred responsive to determining that packaging 50 has departed the geofenced area. For instance, responsive to determining that the current position of packaging 50 has moved out of the geofenced area, sensors 400 and/or circuitry 300 may determine that an event has occurred.

As another example, one or more of sensors 400 may determine that an event has occurred based on movement of packaging 50. For instance, one or more motion sensors of sensors 400 may generate motion data that represents movements of packaging 50. Responsive to determining that movements of packaging 50 correspond to predefined movements and gestures (e.g., motion of putting packaging 50 on a shelf, motion of removing packaging 50 from a shelf, motion of packaging 50 being carried, motion of packaging 50 being moved across a scanner, motion of packaging 50 being placed in a bag, shaking packaging 50 in a certain pattern, etc.), the sensors of sensors 400 may determine that an event has occurred and output a signal to circuitry 300 indicating occurrence of the event.

As another example, one or more of sensors 400 may determine that an event has occurred based on voice activation commands or acoustic cues proximate to packaging 50. For instance, one or more microphones of sensors 400 may generate audio data that represents sounds occurring proximate to packaging 50. Sensors 400 and/or circuitry 300 may utilize any suitable voice recognition or environment classifications methods to detect that an event has occurred. In at least one mbodiment, sensors 400 and/or circuitry 300 may compare the audio data to audio templates to determine whether any voice activation commands were spoken proximate to packaging 50 (e.g., "charge main battery," "transfer energy," etc.) or whether any acoustic cues were detected proximate to packaging 50. Example acoustic cues include, but are not limited to, acoustic beacon signals broadcasted at a shipping center, at checkout, or at the intended destination. These signals could be encoded such that only specific devices will be activated. The encoding could also provide information as to when the specific devices should charge (e.g., time based, when another acoustic cue is provided, etc.). Other acoustic clues could be the sound of the delivery truck, for example. Responsive to determining that a voice activation command was spoken near packaging 50, sensors 400 and/or circuitry 300 may determine that an event has occurred.

As discussed above, responsive to determining that an event has occurred, circuitry 300 may transfer electrical power between power storage device 200 and rechargeable battery 118 in order to change (e.g., increase or decrease) the charge state of rechargeable battery 118. In some examples, circuitry 300 may immediately begin the transfer of electrical power responsive to determining that an event has occurred. For instance, responsive to determining that packaging 50 has been scanned by a point of sale system, circuitry 300 may immediately enable the transfer of electrical power from power storage device 200 to rechargeable battery 118. In some examples, circuitry 300 may implement a delay (e.g., one hour, 12 hours, one day, two days, five days, etc.) before beginning the transfer of electrical power responsive to determining that an event has occurred. For instance, responsive to determining that packaging 50 has arrived at a distribution center, circuitry 300 may enable the transfer of electrical power from power storage device 200 to rechargeable battery 118 after a delay (e.g., of two days).

In some examples, circuitry 300 may cancel or reverse the transfer of electrical power responsive to determining the occurrence of one or more subsequent events. For instance, responsive to receiving a message indicating that an initial use of device 100 has been postponed, circuitry 300 may cancel or reverse the transfer of electrical power between power storage device 200 and rechargeable battery 118.

In some examples, system 2 may perform one or more operations if device 100 is not initially used within a certain time frame (e.g., one day, one week, one month, etc.) after rechargeable battery 118 is charged to the relatively high charge state. For instance, if device 100 is not initially used within the time frame, circuitry 300 may lower the charge state of rechargeable battery 118 (e.g., back to the reduced charge state). As one example, circuitry 300 may lower the charge state of rechargeable battery 118 by enabling the transfer of electrical power from rechargeable battery 118 to power storage device 200. As another example, circuitry 300 may lower the charge state of rechargeable battery 118 by causing one or more components (e.g., of device 100) to perform energy intensive functions using power sourced from rechargeable battery 118 (e.g., to merely burn off the power as opposed to transferring back to power storage device 200). As such, in some examples, rechargeable battery 118 may trickle back down and/or return power to power storage device 200 if the initial use does not occur within the time frame.

In some examples, characteristics of rechargeable battery 118 (e.g., chemical losses) and/or draw from components of system 2 may cause the charge state of rechargeable battery 118 to lower after being increased to the relatively high charge state. As such, in sonic examples, circuitry 300 may utilize power from power storage device 200 to maintain the charge state of rechargeable battery 118 at the relatively high charge state until at least the initial use of device 100. In this way, the techniques of this disclosure may correct for the gradual discharge of power by rechargeable battery 118.

In some examples, system 2 may include a charger device (e.g., a charging case) for device 100. The charger device may include power storage device 200 and, when power storage device 200 is full (e.g., fully charged or at a high state of charge), the charger device may be capable of charging rechargeable battery 118 multiple times (e.g., increasing the charge state of rechargeable battery 118 from a relatively low level to the relatively high level multiple times). In other words, the capacity of power storage device 200 may be many times larger than the capacity of rechargeable battery 118. In such examples, both power storage device 200 and rechargeable battery 118 may be placed into packaging 50 at a reduced charge state. However, as the capacity of power storage device 200 may be many times larger than the capacity of rechargeable battery 118, power storage device 200 may still have enough power when starting from a reduced charge state to charge rechargeable battery 118 to the relatively high charge, state. Further details of one example of system 2 that includes a charger device are discussed below with reference to FIG. 4.

Figure 2:
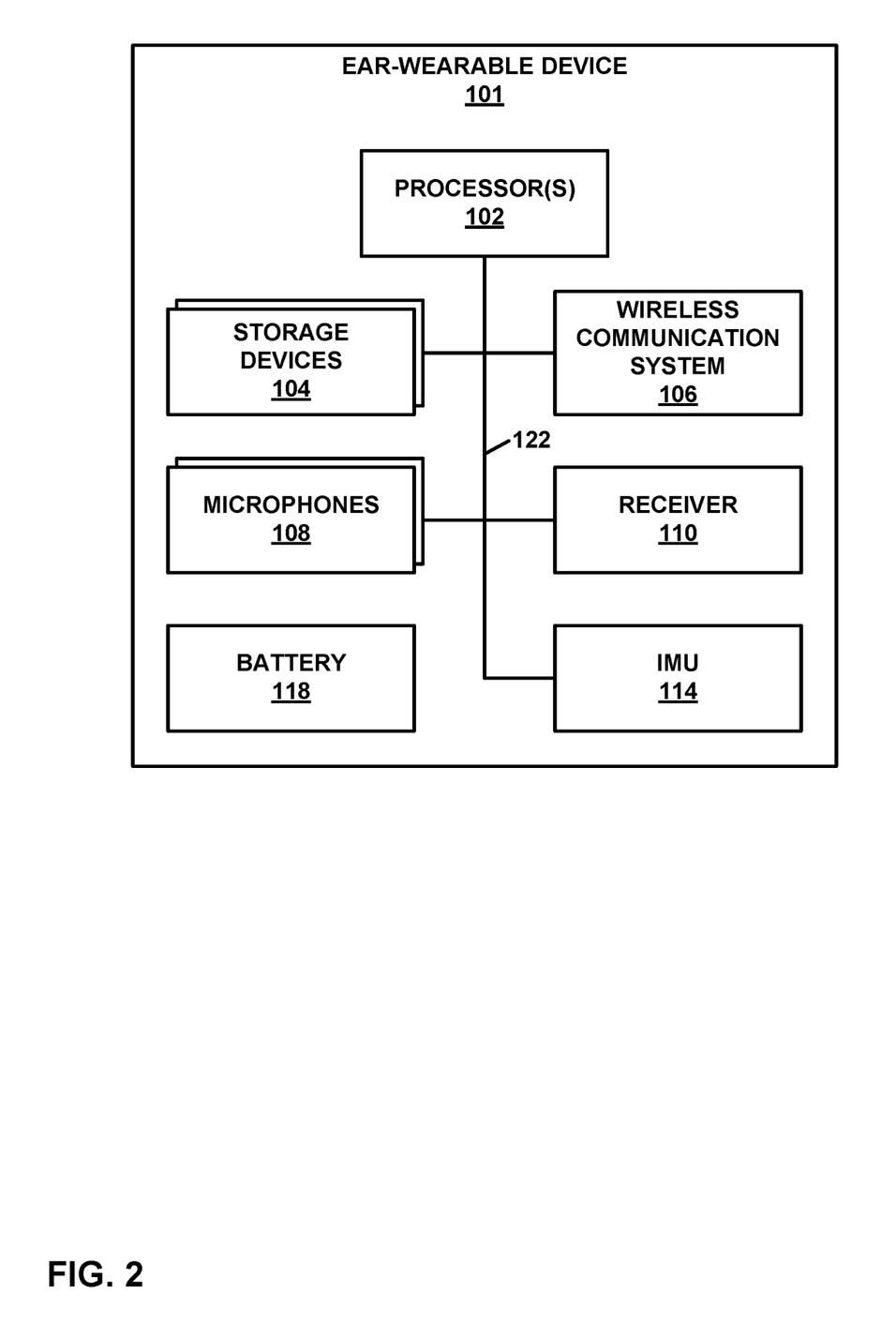
FIG. 2 is a block diagram illustrating example components of ear-wearable device 101 configured according to one or more techniques of this disclosure.

FIG. 2 is a block diagram illustrating example components of ear-wearable device 101 configured according to one or more techniques of this disclosure. Ear-wearable device 101 may be considered to be an example of device 100 of FIG. 1. In the example of FIG. 2, ear-wearable device 101 includes one or more processors 102, one or more storage device(s) 104, one or more wireless communication system(s) 106, one or more microphones 108, one or more receiver(s) 110, one or more inertial measurement unit(s) (IMU) 114, a battery 118, and one or more communication channels 122. Communication channels 122 provide communication between processors 102, storage device(s) 104, wireless communication systems 106, microphones 108, receivers 110, and IMUs 114. Processors 102, storage devices 104, wireless communication systems 106, receivers 110, and IMUs 114 may draw electrical power from battery 118, e.g., via appropriate power transmission circuitry. In other examples, ear-wearable device 101 may include more, fewer, or different components. For instance, in some examples, ear-wearable device 101 may include additional sensors. In some examples, ear-wearable device 101 does not include an MU 114.

Ear-wearable device 101 may belong to one of various types of ear-wearable devices. For example, ear-wearable device 101 may be a Receiver-In-Canal (RIC) hearing aid, an In-The-Eat (ITE) hearing aid, an In-The-Canal (ITC) hearing aid, a Completely-in-Canal (CIC) hearing aid, an Invisible-In-The-Canal (IIC) hearing aid, or another type of hearing aid. In another example, ear-wearable device 101 can include Personal Sound Amplification Products (PSAPs). In another example, ear-wearable device 101 can include one or more of a cochlear implant, cochlear implant magnet, cochlear implant transducer, and cochlear implant processor. In other examples, ear-wearable device 101 can include other types of devices that are wearable in, on, or in the vicinity of the user's ears, such as an earphone, earbud, and the like. In another example, ear-wearable device 101 can include one or more "heatable" devices that provide various types of functionality. In other examples, ear-wearable device 101 can include other types of devices that are implanted or otherwise osseointegrated with the user's skull; wherein the ear-wearable device is able to facilitate stimulation of the wearer's ears via the bone conduction pathway.

In examples where ear-wearable device 101 is a RIC hearing aid, ear-wearable device 101 may comprise a behind-the-ear unit and an in-ear unit connected by a cable. In such examples where ear-wearable device 101 is a RIC hearing aid, the components of ear-wearable device 101 shown in FIG. 2 may be divided among the behind-the-ear unit and the in-ear unit. For instance, the in-ear unit may contain receiver 110 and the behind-the-ear unit may contain the remaining components of ear-wearable device. Other divisions of components among the behind-the-ear unit and the in-ear unit are possible in ear-wearable devices that implement the techniques of this disclosure. For instance, in some examples, the in-ear unit may contain one or more of processors 102 and the behind-the-ear unit may contain one or more other ones of processors 102.

Processors 102 of ear-wearable device 101 include processing circuits for processing information. Processors 102 may include general-purpose microprocessors, digital signal processors (DSPs), application-specific integrated circuits (ASICs), field-programmable gate arrays (FPGAs), microcontroller units, and other types of circuits for processing information. In some examples, one or more of processors 102 retrieve and execute instructions stored in one or more of storage devices 104. The instructions may include software instructions, firmware instructions, or another type of computer-executed instructions. In different examples of this disclosure, processors 102 may enable the transfer of electrical energy to battery 118 fully or partly by executing such instructions, or fully or partly in hardware, or a combination of hardware and execution of instructions. In some examples, the processes for energy transfer are performed entirely or partly by processors of devices outside ear-wearable device 101, such as by other circuitry included in packaging with ear-wearable device 101 (e.g., circuitry 300 of FIG. 1).

Storage device(s) 104 of ear-wearable device 101 include devices configured to store data. Such data may include computer-executable instructions, such as software instructions or firmware instructions. Storage device(s) 104 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 104 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Wireless communication system 106 may enable ear-wearable device 101 to send data to and receive data from one or more other computing devices. For example, wireless communication system 106 may enable ear-wearable device 101 to send data to and receive data from another ear-wearable device, a smartphone, a wireless base station, a personal computer, a tablet computer, or another type of device configured for wireless communication. Wireless communication system 106 may use various types of wireless technology to communicate. For instance, wireless communication system 106 may use Bluetooth, 3G, 4G, 4G LTE, 5G, ZigBee, WiFi, Near-Field Magnetic Induction (NMI), or another communication technology. In other examples, ear-wearable device 101 includes a wired communication system that enables ear-wearable device 101 to communicate with one or more other devices via a communication cable, such as a Universal Serial Bus (USB) cable or a Lightning™ cable.

Microphones 108 are configured to convert sound into electrical signals. In other words, microphones 108 may generate one or more input audio signals. In some examples, microphones 108 include a front microphone and a rear microphone. The front microphone may be located closer to the front ventral side) of the user. The rear microphone may be located closer to the rear (i.e., dorsal side) of the user. One or more of microphones 108 are omnidirectional microphones, directional microphones, or other types of microphones. Processors 102 may generate an output audio signal based on the one or more input audio signals generated by microphones 108.

Receiver 110 includes one or more speakers for producing sound based on the output audio signal. Receiver 110 is so named because receiver 110 is the component of ear-wearable device 101 that receives signals to be converted into soundwaves. In some examples, the speakers of receiver 110 include one or more woofers, tweeters, woofer-tweeters, or other specialized speakers for providing richer sound.

IMU 114 may detect linear acceleration of ear-wearable device 101. IMU 114 may include one or more accelerometers, gyroscopes, magnetometers, and barometers. It will be appreciated that an IMU may comprise of any suitable combination of one or more types of motion sensors. In some examples, IMU 114 may output one or more signals that are representative of the linear acceleration of ear-wearable device 101. For instance, IMU 114 may output one or more of a first signal corresponding to acceleration in an X dimension, a second signal corresponding to acceleration in a Y dimension, a third signal corresponding to acceleration in a Z dimension, and a fourth signal corresponding to gyroscope output. This disclosure may refer to the signals output by IMU 114 as IMU signals. Storage devices 104 may store rolling windows of sample values of the one or more IMU signals.

As discussed above, it may be desirable for battery 118 to be placed into packaging (e.g., packaging 50) at a reduced charge state, and also be desirable for battery 118 to be at a relatively high charge state (e.g., greater than 80% charged, greater than 90% charged, 100% charged) when removed from its packaging. For instance, when ear-wearable device 100 is removed from packaging, it may not be desirable to spend time increasing the charge state of (i.e., charging) battery 118 from the reduced charge state prior to initially using ear-wearable device 100.

In accordance with one or more techniques of this disclosure, power from a supplemental power storage device may be used to increase the charge state of battery 118 before an initial use of ear-wearable device 101. For instance, responsive to occurrence of an event prior to ear-wearable device 101 being removed from packaging, battery 118 may receive electrical power from the supplemental power storage device in order to increase the charge state of battery 118. In this way, battery 118 may be placed into packaging at a first charge state, while being removed from the packaging at a second charge state that is higher than the first charge state.

As discussed above, power may be transferred to battery 118 responsive to detecting occurrence of an event. Occurrence of the event may be determined by components external to ear-wearable device 101, components included in ear-wearable device 101 (e.g., processors 102 may perform the operations of circuitry 300 of FIG. 1), or a combination of components external to ear-wearable device 101 and components included in ear-wearable device 101 (e.g., processors 102 may perform a portion of the operations of circuitry 300 of FIG. 1). As such, in some examples, processors 102 may be considered an example of circuitry 300 of FIG. 1.

Occurrence of the event may be determined based on a data generated by one or more sensors. The sensors may be located within or external to ear-wearable device 101. As one example, occurrence of the event may be determined based on data generated by one or more of microphone 108, IMU 114, or wireless communication system 106. As such, the techniques of this disclosure enable sensors that may otherwise be included in ear-wearable device 101 to be used in the detection of events that trigger transfer of electrical power to a battery of ear-wearable device 101. As another example, occurrence of the event may be determined based on data generated by a position sensor external to ear-wearable device 101.

In some examples, the supplemental power storage device (i.e., the device that provides energy to charge battery 118 after occurrence of the event, illustrated in FIG. 1 as power storage device 200), may be included in packaging of ear-wearable device 101 outside of a housing of ear-wearable device 101. For instance, the supplemental power storage device may be a primary cell included in packing and connected to ear-wearable device 101 via wires or conductive filament.

In some examples, the supplemental power storage device may be attached to a housing of ear-wearable device 101. For instance, the supplemental power storage device may be a "wart" attached to the housing of ear-wearable device 101 that may be removed prior to regular use of ear-wearable device 101.

In some examples, the supplemental power storage device may be included within a housing of ear-wearable device 101. For instance, the supplemental power storage device may be included in a region of ear-wearable device 101 that includes user controls (e.g., buttons, rocker switches, volume wheels, etc.) or any other region of ear-wearable device 101. In some examples, where the supplemental power storage device is included within the housing, the supplemental power storage device may provide structural support for one or more other components of ear-wearable device 101. For instance, the supplemental power storage device may act as a "mother" board to which other components may be adhered and held in place. As such, in some examples, the supplemental power storage device, battery 118, and the components that determine occurrence of the event (e.g., processors 102) may all be located within the housing of ear-wearable device 101. In some examples, the supplemental power storage device may be included within battery 118. In such examples, the supplemental power storage device and battery 11S may be referred to as a compound battery. Further details of one example of a compound battery is discussed below with reference to FIGS. 3A-3C.

In some examples where the supplemental power storage device is to be included within a housing of ear-wearable device 101, the supplemental power storage device may be a rechargeable battery. As such, ear-wearable device 101 may include two rechargeable batteries, the supplemental power storage device (e.g., power storage device 200 of FIG. 1) and a main battery (e.g., battery 118 of FIG. 1). In some of such examples, the supplemental power storage device may further be used to power one or more components of ear-wearable device 101. For instance, the supplemental power storage device may provide electrical power to a digital signal processor (DSP) of ear-wearable device 101. In some examples, using the supplemental power storaae device to power the DSP may enable omission of a low-drop out (LDWO) regulator that would otherwise be used to provide power to the DSP.

As discussed above, to enable the availability of a higher charge state (e.g., for an initial use) battery 118 may be placed in packaging 50 at a low charge state and, responsive to occurrence of an event prior to ear-wearable device 101 being removed from the packaging, battery 118 may receive electrical power from the supplemental power storage device in order to increase the charge state of battery 118. In some examples, in addition to or in place of transferring electrical power from the supplemental power storage device to battery 118, the supplemental power storage device and battery 118 may collectively provide power for ear-wearable device 101 (e.g., to provide power for the initial use). For instance, both the supplemental power storage device and battery 118 may be placed in packaging 50 at a reduced charge state. When ear-wearable device 101 is initially used (e.g., fora programming session), ear-wearable device 101 may source power from both the supplemental power storage device and battery 118.

Figure 3A:
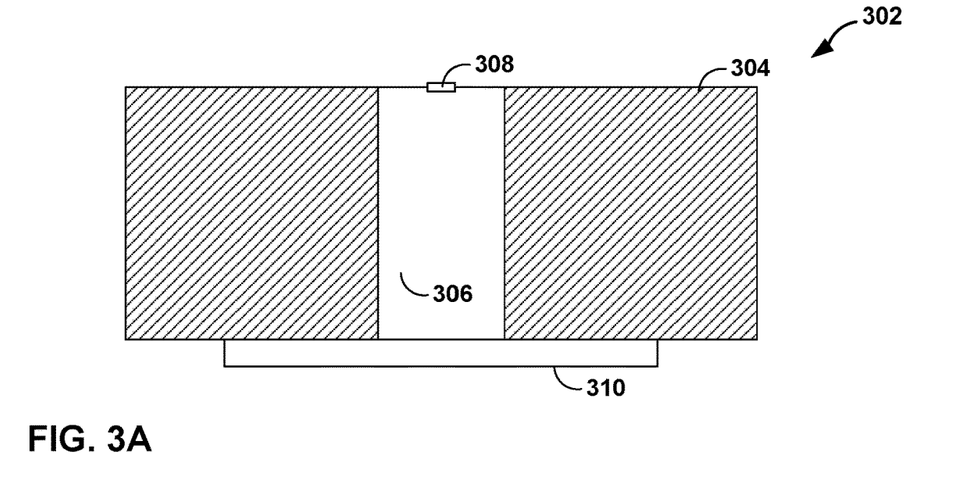
FIGS. 3A-3C are conceptual diagrams illustrating an example compound battery 302 of this disclosure.
Figure 3B:
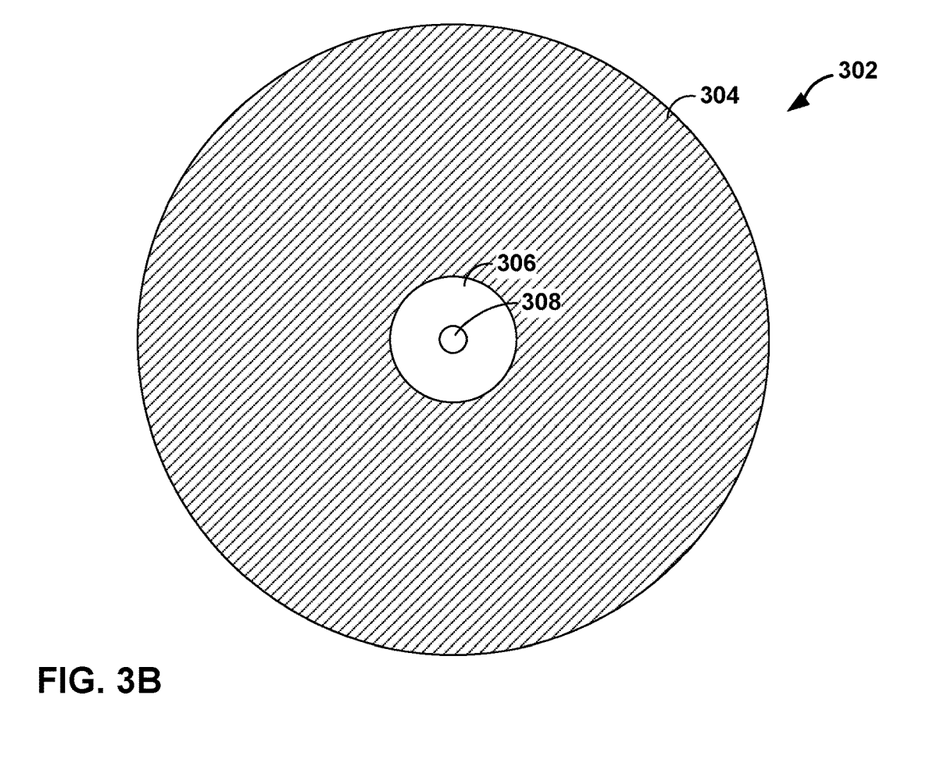
Figure 3C:
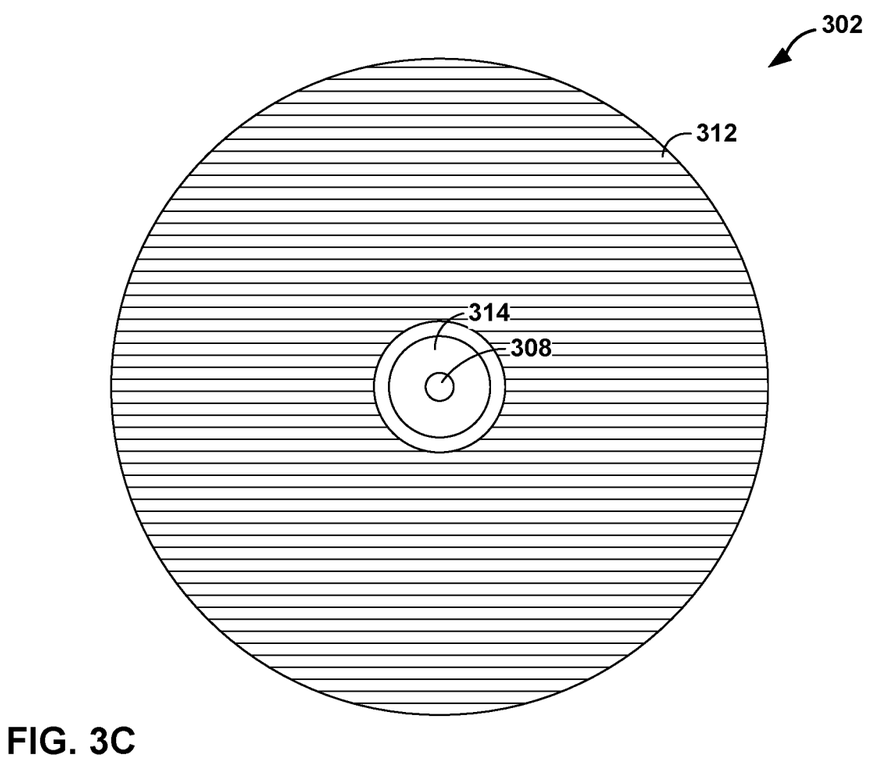

FIGS. 3A-3C are conceptual diagrams illustrating an example compound battery 302 of this disclosure. FIG. 3A illustrates a side view of compound battery 302, FIG. 3B illustrates a top view of compound battery 302, and FIG. 3C illustrates example contacts of compound battery 302. Compound battery 302 includes main battery 304 and supplemental battery 306. Main battery 304 may be an example of battery 118 of FIG. 1 and FIG. 2, and supplemental battery 306 may be an example of power storage device 200 of FIG. 1.

In the example of FIGS. 3A-3C, main battery 304 may be a lithium battery and supplemental battery 306 may be a metal-air battery (e.g., a zinc-air battery) that generates electrical energy using oxygen from air. As such, as shown in FIGS. 3A-3C, supplemental battery 306 includes air inlet 308 to allow air to enter supplemental battery 306. As shown in FIGS. 3A-3C, main battery 304 and supplemental battery 306 may both be cylindrical in shape, with supplemental battery 306 being radially surrounded by main battery 304. As such, main battery 304 and supplemental battery 306 may be configured in a battery-in-battery arrangement.

As shown in FIG. 3A, compound battery 302 may include ground contact 310 that is connected to anodes of both main battery 304 and supplemental battery 306. Additionally, as shown in FIG. 3C, compound battery 302 may include contact 312 that is connected to a cathode of main battery 304 and contact 314 that is connected to a cathode of supplemental battery 306.

As discussed above, responsive to an event, electrical energy sourced from supplemental battery 306 may be used to increase a charge state of main battery 304. In this way, main battery 304 may be stored and shipped at a reduced charge state, while also being brought up to a higher charge state prior to initial use of a device that includes compound battery 302.

Figure 4:
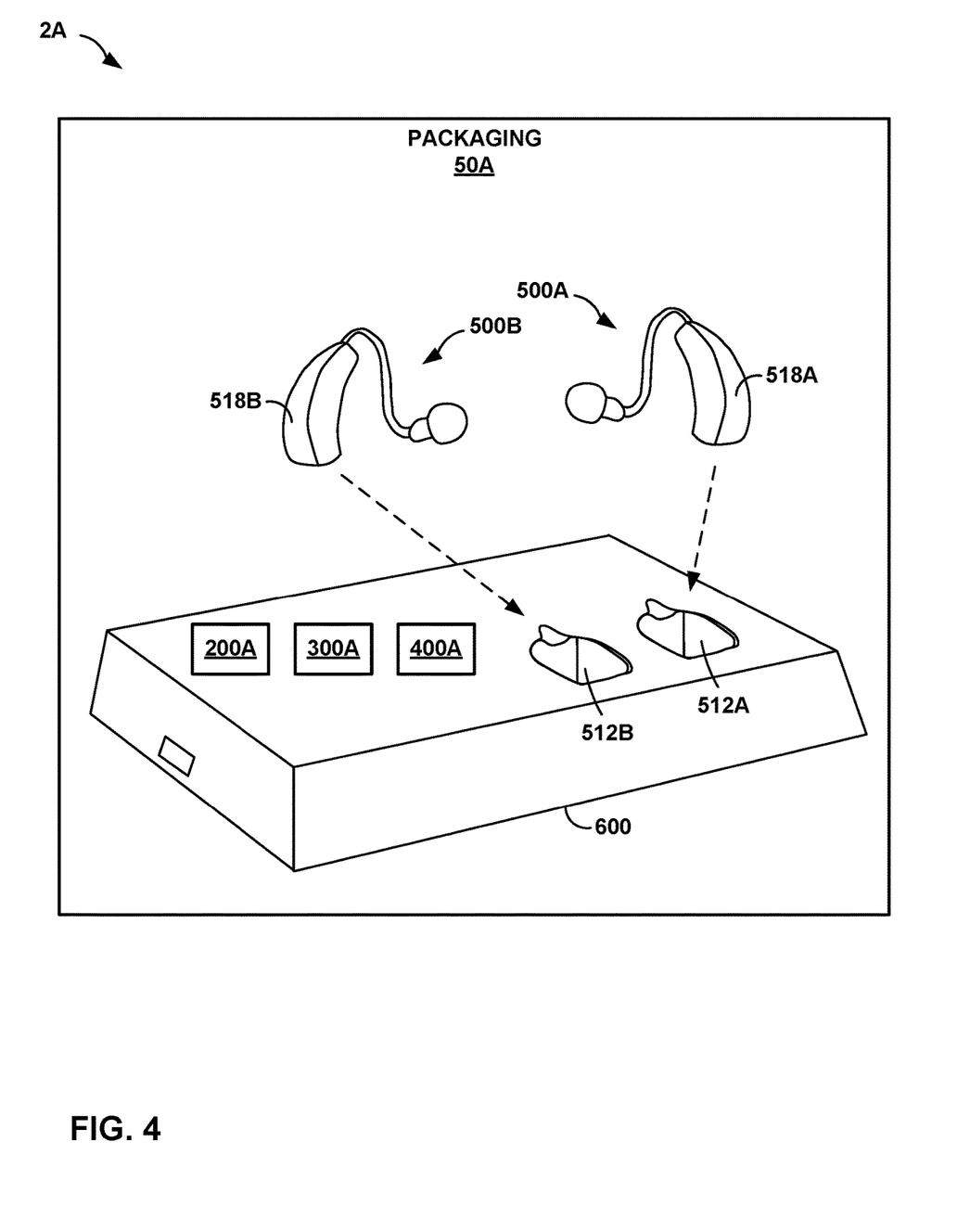
FIG. 4 is a conceptual diagram illustrating an example system including a charger case configured to increase a charge state of a rechargeable battery of a device prior to an initial use of the device, in accordance with one or more techniques of this disclosure.

FIG. 4 is a conceptual diagram illustrating an example system including a charger case configured to increase a charge state of a rechargeable battery of a device prior to an initial use of the device, in accordance with one or more techniques of this disclosure. As shown in FIG. 4, system 2A includes packaging 50A, devices 500A and 500B (collectively, "devices 500"), and charger case 600.

Devices 500 may be examples of device 100 of FIG. 1. For purposes of illustration, devices 500 are shown in FIG. 4 as two ear-wearable devices. However, as discussed above, devices 500 may be any quantity of any type of device. As shown in FIG. 4, each of devices 500 may include a respective rechargeable battery 518. For example, device 500A includes rechargeable battery 518A and device 500B includes rechargeable battery 518B.

Charging case 600 is configured to store and charge one or more of devices 500. Charging case 600 may be a portable case. In some examples, charging case 600 may conic in a variety of different shapes and sizes that are suitable for carrying in a person's hand, securing to a person's body, or stowing in a clothes pocket or other secure location. In some examples, charging case 600 may be approximately four cubic inches or less, for instance, two inches wide by two inches tall, by three quarter inches deep, as one example. In some examples, charging case 600 may be greater than four cubic inches or less, for instance, three inches wide by two or three inches tall, by one inch deep, as one example. One dimension (i.e., height, width, or depth) may be decreased to accommodate an increase in another dimension to cause charging case 600 to have a different shape, without increasing volume or sacrificing portability. For instance, charging case 600 may be one and a half inches tall by one and a half inches wide by two inches deep, as one example. In other examples, charging case 600 may be spherical, cylindrical, conical, or have some other shape. For example, charging case 600 may be a four inch diameter disk shape that is a half inch thick.

As shown in FIG. 4, charging case 600 includes one or more retention structures 512A-512B (collectively "retention structures 512"). Each of retention structures 512 is configured to retain at least a portion of a device of devices 500. As used herein, the term "retention structure" refers to a structure that defines a cavity, a hole, an aperture, a recess, a groove, a slot, a space inside a retaining wall of a housing, or any other form of retention structure. In some examples, other features are included in a retention structure or other embodiments are possible. For example, the retention structure may be a retention area, or mounting area.

Retention structures 512 may include mechanical components that receive one or more electrical connections (pins, pads, leafs, nodes, etc.) that contact corresponding electrical connections of devices 500. In sonic cases, no physical contact between the electrical connections of retention structures 512 and devices 500 are necessary; retention structures 512 may instead be inductively coupled to devices 500 for charging the power source or otherwise exchanging electrical signals. For instance, retention structure 512A may establish an electrical connection with device 500A and provide electrical power to charge (e.g., increase a charge state orechargeable battery 518A. Similarly, retention structure 512B may establish an electrical connection with device 500B and provide electrical power to charge (e.g., increase a charge state of) rechargeable battery 518B.

As shown in FIG. 4, charging case 600 may include one or more of power storage device 200A, circuitry 300A, and sensors 400A. Power storage device 200A, circuitry 300A, and sensors 400A may be considered to be examples of power storage device 200, circuitry 300, and sensors 400 of FIG. 1. For instance, circuitry 300 may be configured to transfer electrical energy from power storage device 200 to charge one or both of rechargeable batteries 518A and 518B while charging case 600 and devices 500 are still in packaging 50A.

Figure 5:
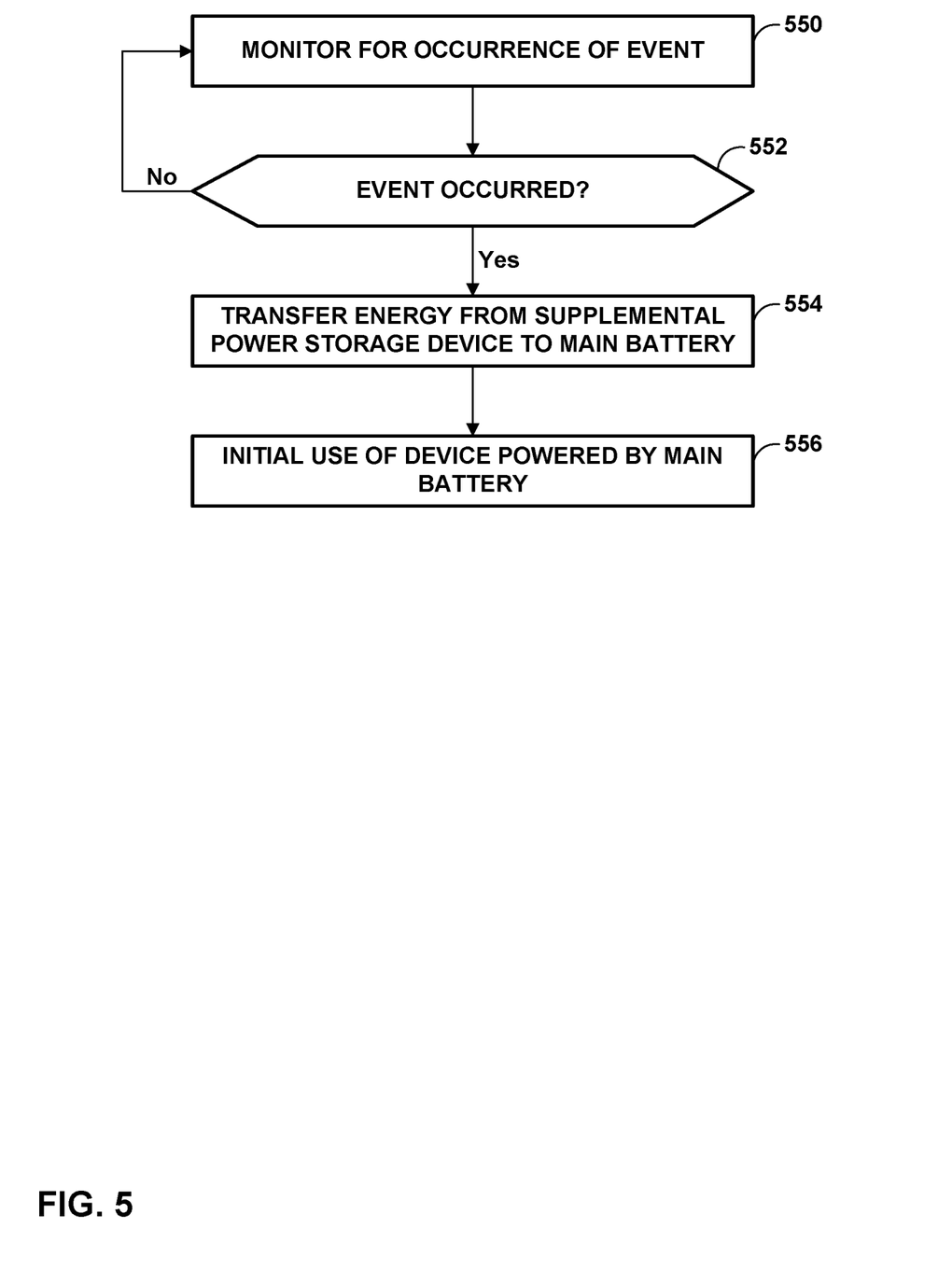
FIG. 5 is a flowchart of an example operation of this disclosure.

FIG. 5 is a flowchart of an example operation of this disclosure. The flowchart of this disclosure is provided as an example. In other examples consistent with the techniques of this disclosure, operations may include more, fewer, or different actions, or actions may be performed in different orders.

Initially, a device may be placed into packaging with a rechargeable battery of the device charged to a reduced charge state. A supplemental power storage device may also be placed into the packaging. For instance, device 100 may be placed into packaging 50 with rechargeable battery 118 half charged, and power storage device 200 may also be placed into packaging 50. In some examples some or all of the components may be placed into packaging 50 within a seal that protects against contamination (e.g., a hermetic seal) and/or demonstrates that the components have not been modified since being placed into the package (e.g., a safety seal).

Circuitry 300 may monitor for occurrence of an event (550). As discussed above, some example events include, but are not limited to, point of sale scanning, activation at checkout, adjustment of physical control (e.g., button, pull-tab, etc.) on packaging 50, leaving a distribution center, carrier tracking events, inter-package communication, removal of packaging 50 from shelf or box, opening of packaging 50, arrival to or departure from geofenced area, movement of packaging 50, voice activation, etc.

Where an event has not occurred ("No" branch of 552), circuitry 300 may continue to monitor for occurrence of an event (550). Where an event has occurred ("Yes" branch of 552), circuitry 300 may cause the transfer of electrical energy from the supplemental power storage device to the rechargeable battery (554). For instance, circuitry 300 may utilize power from power storage device 200 to increase the charge state of rechargeable battery 118.

Device 100, which is powered (at least in part) by rechargeable battery 118, may be initially used/removed from packaging (556). As power from power storage device 200 is used to increase the charge state of rechargeable battery 118 prior to the initial use, the charge state of rechargeable battery 118 may be higher when removed from packaging 50 than when originally placed into packaging 50. In some examples, initial use of the device may include one or more high current draw activities, such as programming. By enabling charging of rechargeable battery 118 prior to the initial use, the high current draw activities may be perfbrmed without having to wait for rechargeable battery 118 to charge.

While discussed above as transferring power from a supplemental power storage device to power storage device 200, the techniques of this disclosure are equally applicable to the reverse. For instance, circuitry 300 may be configured to cause a transfer of electrical energy from power storage device 200 to the supplemental power storage device. As such, in some examples, circuitry 300 may cause the transfer of electrical between power storage device 200 and the supplemental power storage device, in either direction.

As discussed above, device 100, power storaae device 200, and circuitry 300 may be placed into packaging 50. In some examples some or all of the components may he placed into packaging 50 within a seal that protects against contamination (e.g., a hermetic seal) and or demonstrates that the components have not been modified since being placed into the package (e.g., a safety seal). By enabling charging of rechargeable battery 118 of device 100 using electrical energy stored by another device that can be included within the seal, the techniques of this disclose enable a purchaser of device 100 to break, or witness the breaking, of the seal (e.g., thus allowing the purchaser to verify the lack of contamination and/or lack of modification).

In some examples, the breaking of the seal may allow air to enter an area it previously could not. For instance, where power storage device 200 includes an air-activated battery, the breaking of the seal may cause the air-activated battery to charge up and provide power (e.g., to charge rechargeable battery 118). In some examples, there may be multiple seals such that the breaking of a first seal enables air to reach the air-activated battery, while a second seal still protects at least device 100.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be perronned concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storaae media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection may be considered a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transitory, tangible storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following

What is claimed is:

1. A system comprising:
   an ear-wearable device comprising a housing and a rechargeable battery located within the housing;

a supplemental power storage device located within or attached to an exterior of the housing, configured to provide electrical energy; and circuitry configured to transfer, responsive to occurrence of an event, the electrical energy from the supplemental power storage device to the rechargeable battery prior to an initial use of the ear-wearable device, wherein the ear-wearable device, the supplemental power storage device, and the circuitry and disposed within a product package during shipping, wherein the circuitry includes one or more magnetic field sensors and is included within the housing, wherein the one or more magnetic field sensors include one or more near field magnetic induction (NFMI) sensors, and wherein the event includes scanning of the product package at a point of sale.

2. The system of claim 1, wherein the supplemental power storage device is not rechargeable.

3. The system of claim 1, wherein the supplemental power storage device is positioned within the rechargeable battery.

4. The system of claim 1, further comprising the product package, wherein, prior to the initial use of the ear-wearable device, the ear-wearable device and the supplemental power storage device are enclosed within the product package.

5. The system of claim 4, wherein the rechargeable battery of the ear-wearable device is not fully charged during shipment of the product package.

6. The system of claim 1, wherein the event further includes one or more of:
adjusting of a physical control of the product package,
generating of tracking events by a carrier of the product package,
communicating with another product package,
removing of the product package from a shelf,
opening of the product package,
arrival the product package to a geofenced area,
departure of the product package from the geofenced area,
movement of the product package,
detection of one or more acoustic cues, and
detection of one or more voice activation commands.

7. The system of claim 1, wherein the circuitry includes one or more of:
one or more motion sensors;
one or more position sensors;
one or more wireless radios; and
one or more physical controls.

8. The system of claim 1, wherein the one or more magnetic field sensors comprise one or more magnetometers.

9. The system of claim 1, wherein the one or more magnetic field sensors comprise one or more near telecoils.

10. The system of claim 1, wherein the one or more magnetic field sensors comprise one or more giant magneto resistance or tunnel magneto resistance sensors.

11. A method comprising:
monitoring, by one or more components included in a product package of a device, for occurrence of an event, wherein the one or more components include one or more near field magnetic induction (NFMI) sensors, and wherein the event includes scanning of the product package at a point of sale; and
responsive to detecting occurrence of the event, transferring electrical energy from a supplemental power storage device included in the product package to a rechargeable battery of the device.

12. The method of claim 11, wherein the device comprises an ear-wearable device.

13. The method of claim 11, wherein the rechargeable battery of the device is not fully charged during shipment of the product package.

14. The method of claim 11, wherein the event further includes one or more of:
adjusting of a physical control of the product package,
generating of tracking events by a carrier of the product package,
communicating with another product package,
removing of the product package from a shelf,
opening of the product package,
arrival the product package to a geofenced area,
departure of the product package from the geofenced area,
movement of the product package,
detection of one or more acoustic cues, and
detection of one or more voice activation commands.

15. A system comprising:
an ear-wearable device comprising a housing and a rechargeable battery located within the housing;
a supplemental power storage device located within or attached to an exterior of the housing, configured to provide electrical energy; and
circuitry configured to transfer, responsive to occurrence of an event, the electrical energy from the supplemental power storage device to the rechargeable battery prior to an initial use of the ear-wearable device,
wherein the ear-wearable device, the supplemental power storage device, and the circuitry and disposed within a product package during shipping, wherein the circuitry includes one or more position sensors and is included within the housing, and wherein occurrence of the event comprises arrival of the product package to a geofenced area or departure of the product package from the geofenced area.

* * * * *